(12) United States Patent
Mues et al.

(10) Patent No.: US 12,466,114 B2
(45) Date of Patent: Nov. 11, 2025

(54) MANUFACTURING METHOD FOR A REINFORCED SEPARATOR

(71) Applicant: AGFA-Gevaert NV, Mortsel (BE)

(72) Inventors: Willem Mues, Mortsel (BE); Hanne Verwaest, Mortsel (BE); Cristina Tudisco, Mortsel (BE)

(73) Assignee: Agfa-Gevaert NV, Mortsel (BE)

( * ) Notice: Subject to any disclaimer, the term of this patent is extended or adjusted under 35 U.S.C. 154(b) by 322 days.

(21) Appl. No.: 18/246,245

(22) PCT Filed: Sep. 9, 2021

(86) PCT No.: PCT/EP2021/074757
§ 371 (c)(1),
(2) Date: Mar. 22, 2023

(87) PCT Pub. No.: WO2022/063584
PCT Pub. Date: Mar. 31, 2022

(65) Prior Publication Data
US 2023/0356440 A1    Nov. 9, 2023

(30) Foreign Application Priority Data
Sep. 24, 2020 (EP) .................................. 20198114

(51) Int. Cl.
B29C 41/26    (2006.01)
B29K 81/00    (2006.01)
B29K 509/00   (2006.01)
C25B 1/04     (2021.01)
C25B 9/19     (2021.01)
C25B 13/05    (2021.01)

(52) U.S. Cl.
CPC ............... *B29C 41/26* (2013.01); *C25B 1/04* (2013.01); *C25B 9/19* (2021.01); *C25B 13/05* (2021.01); *B29K 2081/04* (2013.01); *B29K 2509/00* (2013.01); *Y02E 60/36* (2013.01)

(58) Field of Classification Search
CPC ............ B29C 41/26; C25B 13/05; C25B 1/04
See application file for complete search history.

(56) References Cited

FOREIGN PATENT DOCUMENTS

EP    0082393 A2    6/1983
EP    0232923 A1    8/1987
(Continued)

OTHER PUBLICATIONS

Translation of KR-20180013848-A (Year: 2018).*
(Continued)

*Primary Examiner* — John J DeRusso
(74) *Attorney, Agent, or Firm* — Leydig, Voit & Mayer, Ltd.

(57) ABSTRACT

A method of preparing a reinforced separator comprising the steps of:—providing a porous support (6) on a pre-wetted casting drum (23);—applying a dope solution (3) including a polymer resin and hydrophilic inorganic particles on a side of the porous support other than the side of the porous support in contact with the pre-wetted casting drum;—performing phase inversion (9, 1) of the applied polymer solution thereby obtaining a reinforced separator; and—removing the reinforced separator (7) from the casting drum; wherein the casting drum is pre-wetted with a non-solvent for the polymer resin.

13 Claims, 4 Drawing Sheets

(56) References Cited

FOREIGN PATENT DOCUMENTS

| | | | |
|---|---|---|---|
| EP | 1233036 A1 | | 8/2002 |
| JP | 2000-506439 A | | 5/2000 |
| JP | 2010-149011 A | | 7/2010 |
| JP | 2020-007574 A | | 1/2020 |
| KR | 20180013848 A | * | 2/2018 |
| WO | WO 1997/033681 A1 | | 9/1997 |
| WO | WO 2007/007819 A1 | | 1/2007 |
| WO | WO 2009/147084 A1 | | 12/2009 |
| WO | WO 2009/147086 A1 | | 12/2009 |
| WO | WO 2013/143833 A1 | | 10/2013 |
| WO | WO 2015/140356 A2 | | 9/2015 |
| WO | WO 2019/011844 A1 | | 1/2019 |

OTHER PUBLICATIONS

European Patent Office, International Search Report in International Patent Application No. PCT/EP2021/074757, mailed Dec. 1, 2021, 4 pp.

European Patent Office, Written Opinion in International Patent Application No. PCT/EP2021/074757, mailed Dec. 1, 2021, 6 pp.

* cited by examiner

MANUFACTURING METHOD FOR A REINFORCED SEPARATOR

CROSS-REFERENCE TO RELATED APPLICATIONS

This patent application is the U.S. national stage of copending International Patent Application No. PCT/EP2021/074757, filed Sep. 9, 2021, which claims the benefit of European Patent Application No. 20198114.9, filed Sep. 24, 2020.

TECHNICAL FIELD OF THE INVENTION

The present invention relates to a method of manufacturing a reinforced separator and to their use in alkaline water electrolysis.

BACKGROUND ART FOR THE INVENTION

Nowadays, hydrogen is used in several industrial processes, for example its use as raw material in the chemical industry and as a reducing agent in the metallurgic industry. Hydrogen is a fundamental building block for the manufacture of ammonia, and hence fertilizers, and of methanol, used in the manufacture of many polymers. Refineries, where hydrogen is used for the processing of intermediate oil products, are another area of use.

Hydrogen is also being considered an important future energy carrier, which means it can store and deliver energy in a usable form. Energy is released by an exothermic combustion reaction with oxygen thereby forming water. During such combustion reaction, no greenhouse gases containing carbon are emitted.

For the realization of a low-carbon society, renewable energies using natural energy such as solar light and wind power are becoming more and more important.

The production of electricity from wind power and solar power generation systems is very much dependent on the weather conditions and therefore variable, leading to an imbalance of demand and supply of electricity. To store surplus electricity, the so-called power-to-gas technology wherein electrical power is used to produce gaseous fuel such as hydrogen, attracted much interest in recent years. As production of electricity from renewable energy sources will increase, the demand for storage and transportation of the produced energy will also increase.

Alkaline water electrolysis is an important manufacturing process wherein electricity may be converted into hydrogen.

In an alkaline water electrolysis cell, a so-called separator or diaphragm is used to separate the electrodes of different polarity to prevent a short circuit between these electronic conducting parts (electrodes) and to prevent the recombination of hydrogen (formed at the cathode) and oxygen (formed at the anode) by avoiding gas crossover. While serving in all these functions, the separator should also be a highly ionic conductor for transportation of hydroxyl ions from the cathode to the anode.

A separator typically includes a porous support. Such a porous support reinforces the separator facilitating the manipulation of the separator and the introduction of the separator in an electrolyser as disclosed in EP-A 232923 (Hydrogen Systems).

A preferred porous support is prepared from polypropylene (PP) or polyphenylene sulphide (PPS) due to their high resistance to high-temperature, high concentration alkaline solutions.

WO2009/147084 and WO2009/147086 (Agfa Gevaert and VITO) disclose a process of preparing a reinforced separator wherein a polymer solution, also referred to as a dope solution, is coated on both sides of a porous support. This method is however not optimal for preparing thin separators. Coating a polymer solution on both sides of a thin porous support, which is typical for such thin separators, is critical and may result in waviness of the separator.

Thin separators including a thinner porous support result however in an improved electrolyse efficiencies due to a higher ionic conductivity.

A method wherein a polymer solution is applied on only one side of a porous support typically uses a temporary support. For example in the method disclosed in EP-A 232923 referred to above, a dope solution is first applied on a temporary support. A porous support is then immersed in the applied polymer solution. After a coagulation step, the temporary support is removed from the resulting reinforced separator.

An alternative for such a temporary support is a so-called supporting casting drum. The casting drum supports the porous support on one side while a polymer solution is applied on the other side of the porous support. After a coagulation step, the resulting separator is then removed from the casting drum. However, such a method also has several disadvantages such a complexity and throughput, as described in more detail below.

There is thus a need to for a less complex and more cost effective manufacturing method for thin reinforced separators.

SUMMARY OF THE INVENTION

It is an object of the invention to provide a less complex and cost effective method for preparing a thin reinforced separator having sufficient mechanical qualities and an improved ion conductivity.

This object is realized by the method as defined in claim 1.

Further objects of the invention will become apparent from the description hereinafter.

DETAILED DESCRIPTION OF THE INVENTION

Method of Preparing a Reinforced Separator

A method of preparing a reinforced separator typically includes the following steps:
- providing a porous support,
- applying a dope solution including a polymer resin, hydrophilic particles and a solvent on a side of the porous support,
- performing phase inversion of the applied dope solution.

The applied dope solution typically impregnates the porous support before the phase inversion step. Alternatively, the porous support may be immersed into the applied dope just before performing phase inversion.

The phase inversion step is typically carried out in a non-solvent for the polymer resin. Such a phase inversion is also referred to as a Liquid Induced Phase Separation (LIPS).

Figure 1:
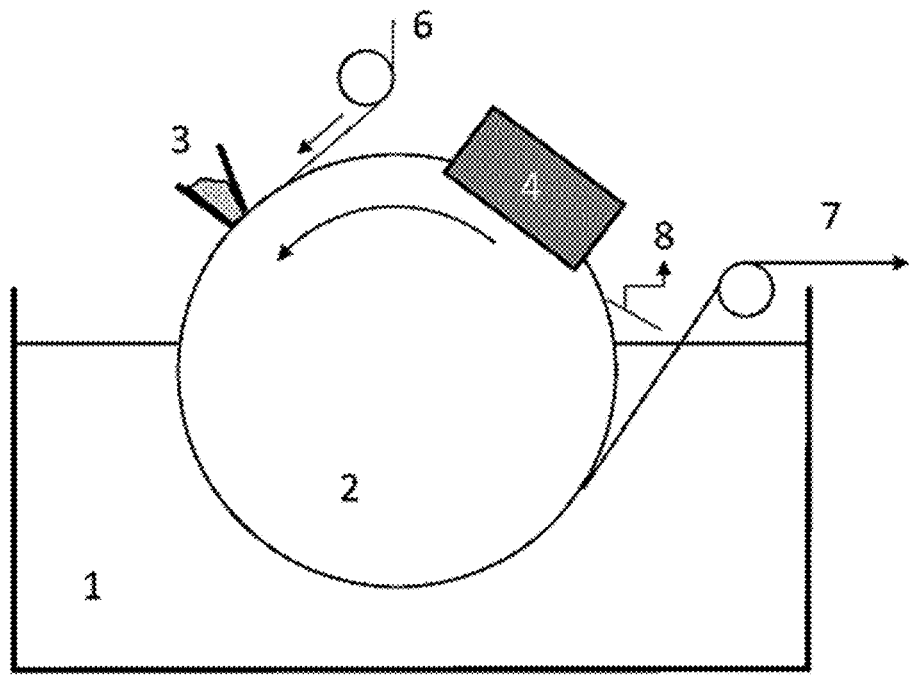
FIG. 1 schematically illustrates a state of the art method of preparing a reinforced separator using a supporting casting drum wherein a polymer solution is coated on one side of a porous support.

FIG. 1 shows a state of the art manufacturing process for preparing reinforced separators wherein a dope solution is applied on one side of a porous support and wherein a supporting casting drum is used.

A porous support (6) is provided on a casting drum (2). A dope solution is then applied (3) on a side of the porous support not in contact with the casting drum. The applied dope solution impregnates the porous support and when the porous support is fully impregnated makes contact with the casting drum surface, which rotates into a coagulation bath (1). The coagulation bath contains a non-solvent for the polymer resin of the dope solution, typically water.

The applied dope solution comes in contact with the non-solvent of the coagulation bath (1) from only one side. This typically results in so-called asymmetric separators having small pores at the contact side with the non-solvent and larger, less defined, pores at the other side of the separator making contact with the casting drum.

The coagulated dope solution, also referred to as membrane, at least partially embedded in the porous support, typically a fabric, is then further guided (7) to a washing section, a drying section and finally winded up.

When the casting drum rotates out of the coagulation bath, its surface is wiped or scraped off (8) and further dried in a drying zone (4) to present a completely dry surface upon which the porous support (6) is provided and the dope solution is applied (3).

The degree of dope penetration into the porous support depends on the open area of the support and the viscosity of the dope solution. Most often however, there will be a high degree of penetration, whereby the dope solution will fully impregnate the porous support and contact the casting drum surface (2).

The separator (7) will only release from the casting drum surface when the phase inversion (coagulation) of the applied dope solution is complete. As long as the applied dope solution is not fully solidified, the separator will stick to the casting drum.

As only one side of the applied solution is in contact with a non-solvent, it will take quite some time before dope solution in contact with the casting drum coagulates (solidifies) and the obtained separator can be released from the casting drum. As long as the coagulation is not complete and the dope solution in contact with the casting drum is still in a liquid, dissolved state the separator cannot be delaminated or released from the casting drum. A delamination would result in a splitting of the applied dope layer.

The time necessary for a complete coagulation of the dope solution depends on the thickness of the applied dope layer, the composition of the dope solution, the type of non-solvent, the temperature of the coagulation bath and other process parameters. When using a rotating casting drum, the contact time of the applied dope solution with a non-solvent from the coagulation bath is determined by the rotating speed of the drum. To enable a complete coagulation resulting in a release of the separator from the casting drum the rotating speed and thus the manufacturing speed will be limited.

An increase of the diameter of the casting drum will extend the contact time between the applied dope solution and the non-solvent of the coagulation bath and will increase manufacturing speed.

Figure 2:
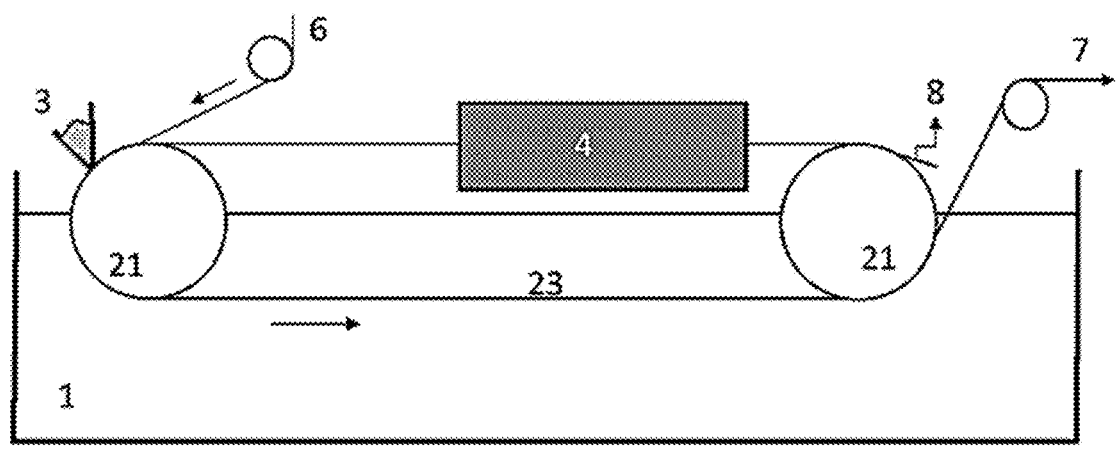
FIG. 2 schematically illustrates another state of the art method of preparing a reinforced separator using a supporting casting belt wherein a polymer solution is coated on one side of a porous support.

Another way to increase the manufacturing speed is using a flat endless belt as shown in FIG. 2. The flat belt (23) is typically made from stainless steel and runs over at least two rollers (21) of which one is driven. By using a longer belt (23) the contact time of a dope solution (3) applied on a porous support (6) with a non-solvent from the coagulation bath (1) will increase resulting in an increase of the manufacturing speed.

However, both increasing the diameter of the casting drum or the implementation of a driven belt increases the complexity and therefore the costs of the manufacturing method.

The above mentioned problems are solved by the manufacturing method according to the present invention wherein a casting drum is homogeneously pre-moistened with a small amount of non-solvent. This will result in phase inversion (coagulation) of the applied dope solution when it comes into contact with the casting drum surface (after full impregnation of the porous support) due to the presence of the non-solvent on the surface of the casting drum. The porous support is fully impregnated with the applied dope solution almost immediately after application of the dope solution on the porous support. In this way, the separator can be delaminated faster from the casting drum and there is no need for a larger diameter of the drum or the use of a belt.

The method of preparing a reinforced separator according to the present invention includes the steps of:
i) providing a porous support (6) on a pre-wetted casting drum (23);
ii) applying a dope solution (3) including a polymer resin, hydrophilic inorganic particles and a solvent on a side of the porous support other than a side of the porous support in contact with the pre-wetted casting drum;
iii) performing phase inversion (9, 1) of the applied polymer solution; and
iv) removing the reinforced separator (7) from the casting drum;
characterized in that the casting drum is pre-wetted with a non-solvent for the polymer resin.

The non-solvent referred to may be a single solvent or a mixture of different solvents, as described below.

According to one embodiment of the invention, the casting drum is pre-wetted by applying a thin layer of non-solvent on the surface of a casting drum.

The non-solvent may be applied on the casting drum by any coating technique, for example dip coating, knife coating, extrusion coating, spray coating, and slide hopper coating.

The layer of non-solvent contains less than 50 g of non-solvent per $m^2$ surface area of the casting drum.

Figure 3:
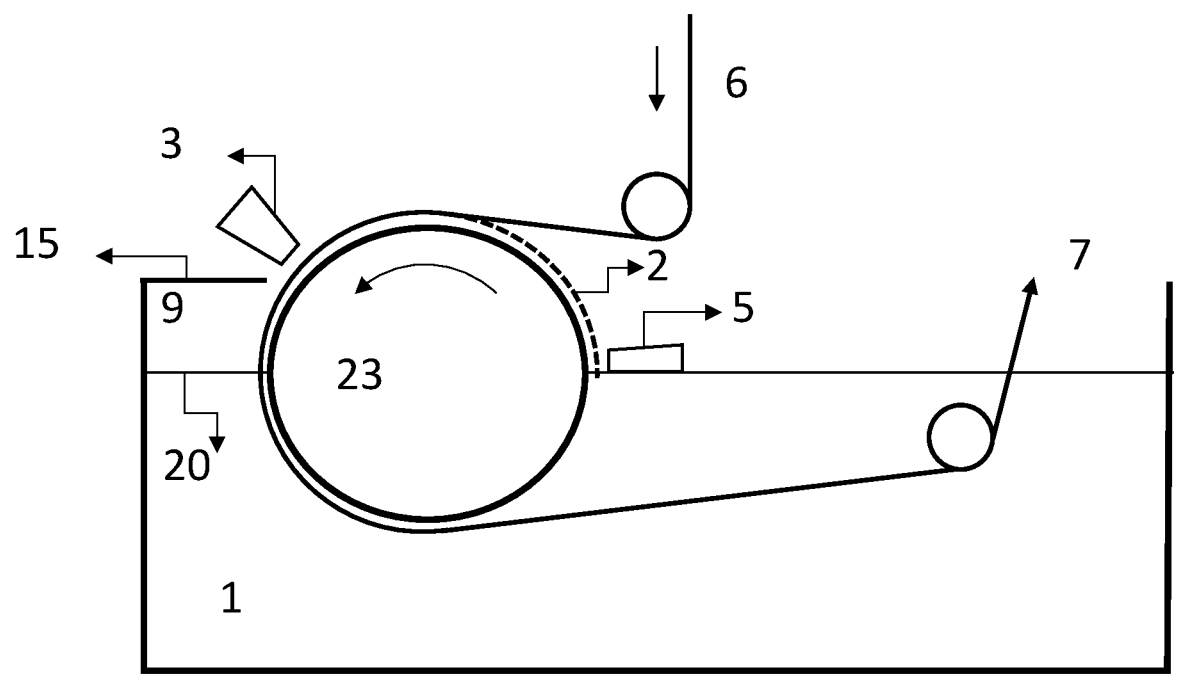
FIG. 3 schematically illustrates a method of preparing a reinforced separator using a supporting casting drum wherein a polymer solution is coated on one side of a porous support according to the present invention.

Preferably the non-solvent used to pre-wet the casting drum is the same non-solvent used in the liquid induced phase inversion step (described below). In this case, the casting drum is preferably pre-wetted by dip-coating wherein the coating (2) is applied from the coagulation bath (1) as shown in FIG. 3. An air-knife or metering roll (5) may be used to adjust the applied layer thickness of the non-solvent.

When the layer of the non-solvent on the casting drum is too thick, the porous support may be too much wetted by the non-solvent, which may result in an insufficient penetration of the applied dope solution into the porous support. A poor penetration of the dope solution into the porous support may result in delamination of the membrane (coagulated dope solution) from the porous support after the coagulation step. A sufficient penetration into the porous support of the dope solution ensures sufficient adhesion of the coagulated polymer layer to the porous support. Such a good adhesion results in good mechanical properties of the separator, important for the manipulation of the separator and its introduction into an electrolyser.

The viscosity of the non-solvent is typically much lower than the viscosity of the dope solution. When the layer of the non-solvent on the casting drum is too thick resulting in a porous fabric, which is too much wetted by the non-solvent, homogeneous coating of the dope solution may become difficult because of so-called slip between non-solvent and dope solution. This is probably due to insufficient shear force built up by viscous force to carry the entire dope package.

For these reasons, the layer thickness of the non-solvent on the casting drum is preferably lower than the thickness of the porous support. More preferably, the thickness of the layer of non-solvent is lower than 50%, most preferably lower than 20%, of the thickness of the porous support.

Figure 4:
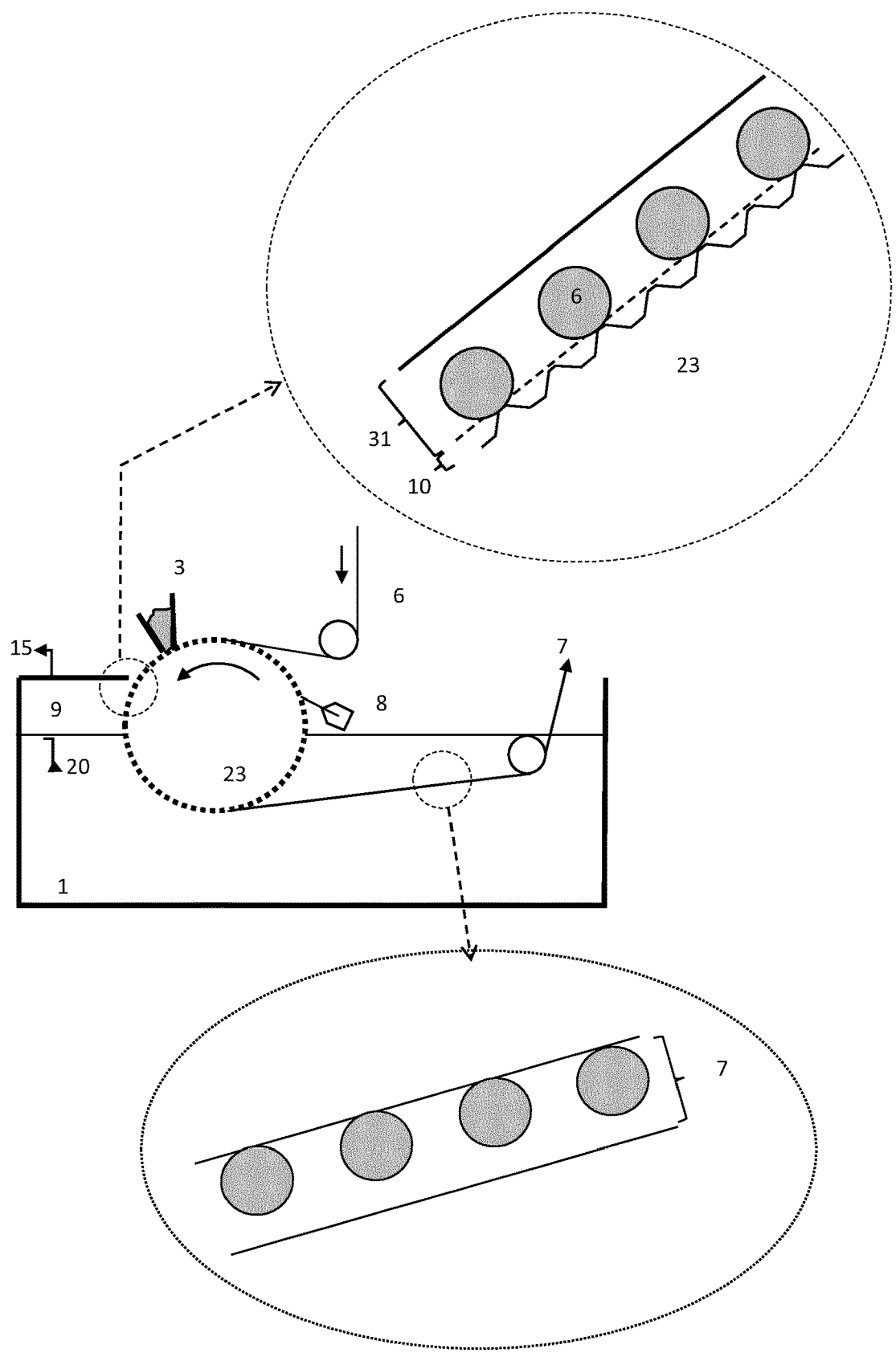
FIG. 4 schematically illustrates another method of preparing a reinforced separator using a supporting engraved casting drum wherein a polymer solution is coated on one side of a porous support according to the present invention.

According to another embodiment of the invention, an engraved roller is used as casting drum as shown in FIG. 4.

The engraved roller or drum (23) rotates in the coagulation bath (1) where the grid or engraving is filled with non-solvent. Excessive non-solvent is preferably removed by a scraper or doctor blade (8).

The amount or volume of non-solvent liquid taken up by the engraved drum depends on the geometry and the depth of the engraved cells in the drum.

The engraving pattern may consist of lines, dots, or a combination of both. A dotted pattern is typical referred to as a cell pattern.

The engraved cells may be quadrangular, pyramid, hexagonal or tri-helical. The cells may also be interconnected by open channel engraving.

Cell count refers to the number of rows of cells per linear centimeter. Cell depth refers to the depth of the cells. Cell volume (cm$^3$/m$^2$) refers to the amount of non-solvent that may be taken up by the engraved roller and is determined by the cell count and the cell depth.

Preferred cell volumes may be below 25 cm$^3$/m$^2$ or even below 10 cm$^3$/m$^2$ depending on engraving pattern, depth and line or cell density.

With a quadrangular cell pattern, a cell volume of 25 cm$^3$/m$^2$ may be obtained by using a cell count of 50 lines/cm and an engraving depth of 75 μm. A cell volume of 10 cm$^3$/m$^2$ may be obtained by using a cell count of 70 lines/cm and engraving depth of 36 μm.

The pattern, for example the lines or dots, may be engraved mechanically or with a laser.

FIG. 4 zooms in on the engraved casting drum (23), the porous support (6) and the resulting separator (7).

The porous support consist of fabric fibres (as described below in more detail), depicted as circles in the enlarged parts of FIG. 4. This illustrates well the open area of the porous support, resulting in a good penetration of the dope solution into the porous support. The reinforced separator (7) consists of the porous support embedded in the coagulated dope solution.

An advantage of using an engraved casting drum is that the porous fabric (6) is little or not soaked in the pre-wetting liquid (10), which will allow a good penetration of the dope solution (3) into the fabric (6). As a result, there is a good anchoring or embedding of fabric with the membrane.

Another advantage of using a pre-wetted drum is that the rapid release of the drum from the not yet fully internally coagulated dope with fabric (7) makes it possible to allow further solvent exchange to take place on both sides, which may improve the production speed.

As described in more detail below, the phase inversion step may also include a Vapour Induced Phase Separation (VIPS) step (9 in FIG. 4).

When the surface tension of the non-solvent is too high to obtain a good even wetting of the drum surface, whether or not it is engraved, without dewetting spots, then it may be necessary to add a surfactant to the pre-wetting solution to lower its surface tension.

Preferably, the surface tension of the pre-wetting solution is less than 40 mN/m.

A thickening agent may be added to the pre-wetting solution to increase its viscosity.

The viscosity of the pre-wetting solution is preferably below 50 mPa·s.

The casting drum or engraved drum is preferably made from a wear resistant material with enough high surface energy to obtain a good spreading of the applied or doctored "pre-wetting" solution. Materials that may be used as surface of the drum are chromium plating, stainless steel, ceramic, etc.

The submerged part of the drum or engraved drum into the coagulation bath preferably amounts to about 30 to 70%, more preferably to about 40 to 60%, of the total circumference.

Separator for Water Electrolysis

The separator for water electrolysis obtained with the manufacturing method according to the present invention (FIG. 5) comprises a porous support (10) and a porous layer (20b). Such a separator including a porous support is often referred to as a reinforced separator.

A described above in more detail a preferred separator is prepared by the application on one side of a porous support of a coating solution, typically referred to as a dope solution, comprising a polymer resin, hydrophilic inorganic particles and a solvent. A porous layer is then obtained after a phase inversion step wherein the polymer resin forms a three-dimensional porous polymer network.

Upon application of the dope solution on a surface of the porous support, the dope solution impregnates the support. After phase inversion, the impregnation of the porous support ensures that the three-dimensional porous polymer network also extends into the porous support. This results in a good adhesion between the porous hydrophilic layer and the porous support.

Figure 5:
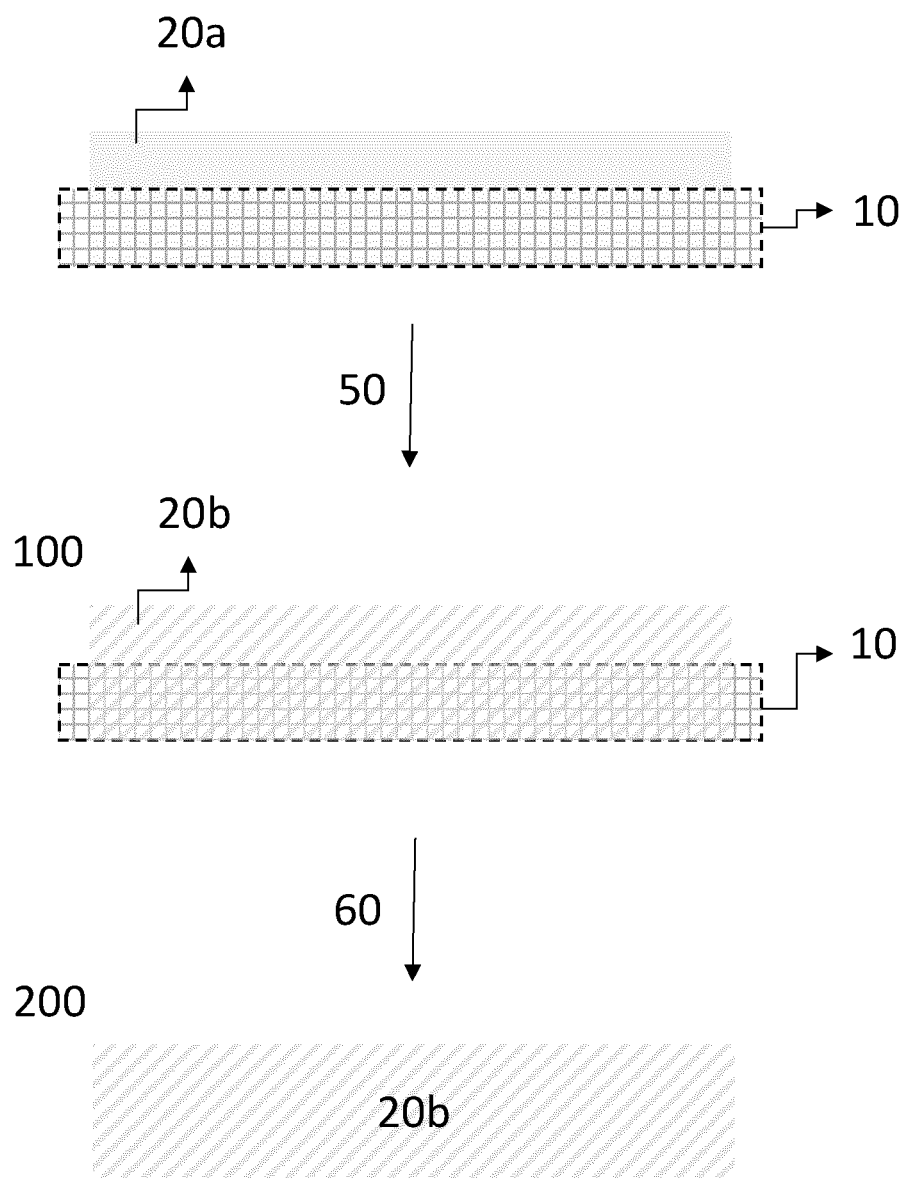
FIG. 5 schematically illustrates two embodiments of a separator obtained with a method according to the present invention.

A preferred separator (100) is schematically shown in FIG. 5. A dope solution (20a) is applied on one side of a porous support (10) and the support is then preferably fully impregnated with the applied dope solution. After a phase inversion step (50), a separator (100) is obtained comprising a support (10) and a porous layer (20b).

The porous support is used to give support and strength to the separator in its manufacturing process, i.e. the coating step and/or coagulation step described below. The reinforcement of the separator by the temporary support in the manufacturing process also facilitates washing, rewinding, etc. of the separator.

The porous support also gives strength and tear resistance to the separator in a converting process, wherein for example the separator is cut into different formats, and in an assembly process, wherein the separator is introduced between the electrodes of an alkaline electrolyser.

However, the porous support may adversely affect the ionic conductivity of the separator. Once placed in an electrolytic cell of an alkaline electrolyser, the reinforcement of the separator by the porous support is not always necessary. Especially is a so-called zero gap configuration, described below, the separator does not vibrate due to escaping gas bubbles and therefore does not suffer from fatigue that could lead to cracks or tearing in the separator.

According to another embodiment of the invention, the porous support is capable of being substantially removed from the separator, preferably by an alkaline solution, more preferably by an electrolyte of an alkaline electrolyser, as disclosed in the unpublished EP-A 20183861.2 (filed Mar. 7, 2020 by Agfa Gevaert).

The alkaline solution or the electrolyte of an alkaline electrolyser is preferably a 10 to 40 wt %, more preferably a 20 to 35 wt %, aqueous KOH solution. A particular preferred alkaline solution or electrolyte is a 30 wt % aqueous KOH solution.

The temperature of the alkaline solution or electrolyte is preferably 50° C. or more, more preferably 80° C. or more.

The removal of the porous support is preferably the result of dissolution of the support in or degradation of the support by an alkaline solution or the electrolyte used in the electrolyser.

A mentioned above, the presence of a porous support to reinforce the separator may adversely affect the ionic conductivity through the separator. Preferably, after removal of the temporary support, the ionic conductivity of the separator increases.

The porous support may optionally be removed before assembly in an electrolyser stack by treatment of the separator (100) with an alkaline solution (60) resulting in the separator (200) as schematically shown in FIG. 5. Referring to FIGS. 3 and 4, such an alkaline treatment is preferably carried out by guiding the separator (7) from the coagulation bath (1) to an alkaline bath.

The thickness of the separator is preferably between 50 and 500 µm, more preferably between 100 and 350 µm.

The pore diameter of the separator has to be sufficiently small to prevent recombination of hydrogen and oxygen by avoiding gas crossover. On the other hand, to ensure efficient transportation of hydroxyl ions from the cathode to the anode, larger pore diameters are preferred. An efficient transportation of the hydroxyl ions requires an efficient penetration of electrolyte into the separator.

The maximum pore diameter (PDmax) of the separator is preferably between 0.05 and 2 µm, more preferably between 0.10 and 1 µm, most preferably between 0.15 and 0.5 µm.

The pore diameter referred to is preferably measured using the Bubble Point Test method described in American Society for Testing and Materials Standard (ASMT) Method F316.

The porosity of the separator is preferably between 30 and 70%, more preferably between 40 and 60%. A separator having a porosity within the above ranges typically has excellent ion permeability and excellent gas barrier properties because the pores of the diaphragm are continuously filled with an electrolyte solution.

Applying the Dope Solution

Coating or casting of the dope solution (3) on one side of the porous support (6) may be done with all known coating systems, preferably a coating system selected from the group consisting of bar or rod coating, extrusion coating and slot coating.

In a highly preferred embodiment, a dope solution is applied by slot die coating. When a dope solution is applied on one side of the support, one slot coating die is typically used. A slot-die head is capable of holding the dope solution at a predetermined temperature, distributing the dope solutions uniformly over the porous support, and adjusting the coating thickness of the applied dope solutions by adapting the flow rate.

The viscosity of the dope solution, when used in slot die coating, is preferably between 1 and 500 Pa·s, more preferably between 10 and 100 Pa·s, at coating temperature and at a shear rate of $1\ s^{-1}$.

The dope solutions are preferably shear-thinning. The ratio of the viscosity at a shear rate of $1\ s^{-1}$ to the viscosity at a shear rate of $100\ s^{-1}$ is preferably at least 2, more preferably at least 2.5, most preferably at least 5.

The porous support (6) is preferably a continuous web.

Immediately after the application, the porous support preferably becomes impregnated with the dope solutions. Preferably, the support becomes fully impregnated with the applied dope solutions.

Phase Inversion Step

After applying a dope solution onto the support, the applied dope solution is subjected to phase inversion. In the phase inversion step, the applied dope solution is transformed into a porous hydrophilic layer.

Any phase inversion mechanism may be used to prepare the porous hydrophilic layers from the applied dope solutions.

The phase inversion step preferably includes a so-called Liquid Induced Phase Separation (LIPS) step, a Vapour Induced Phase Separation (VIPS) step or a combination of a VIPS and a LIPS step. The phase inversion step preferably includes both a VIPS and a LIPS step.

Both LIPS and VIPS are non-solvent induced phase-inversion processes.

In a LIPS step the support coated with a dope solution is contacted with a non-solvent for the polymer resin of the dope solution that is miscible with the solvent of the dope solution.

Typically, this is carried out by immersing the support coated with a dope solution into a non-solvent bath, also referred to as coagulation bath (1).

The non-solvent is preferably water, mixtures of water and an aprotic solvent selected from the group consisting of N-methylpyrrolidone (NMP), dimethylformamide (DMF), dimethylsulfoxide (DMSO) and dimethylacetamide (DMAC), water solutions of water-soluble polymers such as PVP or PVA, or mixtures of water and alcohols, such as ethanol, propanol or isopropanol.

The non-solvent is most preferably water.

The temperature of the coagulation bath is preferably between 20 and 90° C., more preferably between 40 and 70° C.

The transfer of solvent from the coated polymer layer towards the non-solvent bath and of non-solvent into the polymer layer leads to phase inversion and the formation of a three-dimensional porous polymer network. The impregnation of the applied dope solution into the support results in a sufficient adhesion between the obtained hydrophilic layers onto the support.

In a VIPS step, the support coated with the dope solutions is exposed to non-solvent vapour, preferably humid air.

Preferably, the coagulation step included both a VIPS and a LIPS step. Preferably, the support coated with the dope solutions is first exposed to humid air (VIPS step) prior to immersion in the coagulation bath (LIPS step).

In the manufacturing method shown in FIGS. 3 and 4, VIPS is carried out in the area 9, between the slot coating die (3) and the surface of the non-solvent (20) in the coagulation bath (1), which is shielded from the environment with for example a thermal isolated metal plate (15).

The extent and rate of water transfer in the VIPS step can be controlled by adjusting the velocity of the air, the relative humidity and temperature of the air, as well as the exposure time.

The exposure time may be adjusted by changing the distance between the slot coating dies (3) and the surface of the non-solvent (20) in the coagulation bath (1) and/or the speed with which the elongated web 6 is transported from the slot coating die towards the coagulation bath.

The relative humidity in the VIPS area (9) may be adjusted by the temperature of the coagulation bath and the shielding of the VIPS area (15) from the environment and from the coagulation bath.

The speed of the air may be adjusted by the rotating speed of a ventilator, which is incorporated in the VIPS area (9).

After the phase inversion step, preferably the LIPS step in the coagulation bath, a washing step may be carried out.

After the phase inversion step, or the optional washing step, a drying step may be carried out.

Removal Temporary Support

In the embodiment wherein a temporary support is used, as described below, the temporary support may be removed before or after placing the separator between the electrodes of an electrolyser.

When the temporary support is removed before placing the separator into an alkaline electrolyser, dissolved material from the porous support or degradation products of the porous support after removal of the support by the electrolyte of an alkaline electrolyser will not adversely affect the electro-catalytic properties of the electrodes, or the electrolytic process. However, when the support is removed outside the electrolyser the advantage of extra reinforcement to manipulate or handle the separator sheets when assembling the electrolyser stack will not be present.

To remove the temporary support, the separator is preferably subjected to an alkaline solution after the phase inversion step.

Preferably, the separator including the porous support is entered into a bath comprising the alkaline solution.

After the alkaline treatment wherein the support is removed, the resulting separator is preferably subjected to a washing step optionally followed by a drying step.

The alkaline solution is preferably a 20-40 wt % aqueous KOH solution, more preferably a 30 wt % aqueous KOH solution.

The temperature of the alkaline solution is preferably at least 50° C.

Porous Support

The porous support is typically used to reinforce the separator to ensure its mechanical strength.

The thickness of the support is preferably from 20 μm up to 400 μm, more preferably from 40 μm up to 200 μm, most preferably from 60 μm up to 100 μm.

The porous support may be selected from the group consisting of a porous fabric, a porous metal plate and a porous ceramic plate.

The porous support is preferably a porous fabric, more preferably a porous polymer fabric.

The porous polymer fabric may be woven or non-woven. Woven fabrics typically have a better dimensional stability and homogeneity of open area and thickness. However, the manufacture of woven fabrics with a thickness of 100 μm or less is more complex resulting in more expensive fabrics. The manufacture of non-woven fabrics is less complex, even for fabrics having a thickness of 100 μm or less. Also, non-woven fabrics may have a larger open area.

The open area of the porous support is preferably between 30 and 80%, more preferably between 40 and 70%, to ensure a good penetration of the electrolyte into the support.

Suitable porous polymer fabrics are prepared from polypropylene, polyethylene (PE), polysulfone (PS), polyphenylene sulfide (PPS), polyamide/nylon (PA), polyether sulfone (PES), polyphenyl sulfone (PPSU), polyethylene terephthalate (PET), polyether-ether ketone (PEEK), sulfonated polyether-ether keton (s-PEEK), monochlorotrifluoroethylene (CTFE), copolymers of ethylene with tetrafluorethylene (ETFE) or chlorotrifluorethylene (ECTFE), polyimide, polyether imide and m-aramide.

A preferred polymer fabric is prepared from polypropylene (PP) or polyphenylene sulphide (PPS), most preferably from polyphenylene sulphide (PPS).

A polyphenylene sulfide based porous support has a high resistance to high-temperature, high concentration alkaline solutions and a high chemical stability against active oxygen evolved from an anode during the water electrolysis process. Also, polyphenylene sulphide can be easily processed into various forms such as a woven fabric or a non-woven fabric.

The density of the porous support is preferably between 0.1 to 0.7 g/cm$^3$.

The porous support is preferably a continuous web to enable a manufacturing process as disclosed in EP-A 1776490 and WO2009/147084.

The width of the web is preferably between 30 and 300 cm, more preferably between 40 and 200 cm.

According to another embodiment of the invention, the porous support may also be a so-called temporary porous support, as described above.

As such a temporary support is removed in the electrolyser, it does not has to be resistant to the highly alkaline electrolyte solutions.

In order to design fabrics that may be removed from the separator upon alkaline treatment the following approaches are preferred:
- introducing alkaline solubilizing groups on the main polymer of the fabric fibers;
- introducing alkaline reactive groups on the main polymer of the fabric fibers; and
- introducing alkaline degradable functional groups in the backbone of the main polymer of the fabric fibers.

Preferred alkaline solubilizing groups are functional groups having a pKa of 10 and lower, more preferably of 8 and lower and most preferably of 6 and lower. Particularly preferred alkaline solubilizing groups are selected from the group consisting of phenols, sulfonamides, carboxylic acids, phosphonic acids, phosphoric acid esters and sulfonic acids, carboxylic acids being particularly preferred.

Preferred alkaline reactive groups are selected from the group consisting of esters and anhydrides, esters being particularly preferred.

Preferred alkaline degradable groups are esters.

The fabric fibers can be selected from natural polymers, synthetic polymers or combinations thereof. The fabrics are preferably selected from the group consisting of cotton fabrics, silk fabrics, flax fabrics, jute fabrics, hemp fabrics, modal fabrics, bamboo fabrics, pineapple fabrics, basalt fabrics, ramie fabrics, polyester based fabrics, acrylic based fabrics, glass fibre fabrics, aramid fibre fabrics, polyamide fabrics, polyolefine fabrics, polyurethane fabrics and mixtures thereof.

Several strategies have been disclosed to design alkali soluble fabrics.

Making cotton alkaline soluble via post modification is a long known strategy used to design alkaline soluble cellulose based fabrics as disclosed in American Dyestuff Reporter, 50(19), 67-74 (1961) and in U.S. Pat. No. 3,087,775 (US Department of Agriculture). Low functionalized carboxymethyl cellulose type of polymers are particularly preferred.

Polyamides can be functionalized in the backbone with alkaline degradable functional groups such as specific esters as disclosed in U.S. Pat. No. 5,457,144 (Rohm and Haas Company), to design alkaline soluble polyamides.

Polyolefines can be functionalized or copolymerized with monomers comprising alkaline reactive groups or alkaline solubilizing groups, preferably selected from the group consisting of an anhydride and a carboxylic acid. Copolymer of ethylene and acrylic or methacrylic acid and polyethylene, graft functionalized with maleic anhydride are particularly preferred functionalized polyolefines.

In the most preferred embodiment, the fabric is poly(ester) based as this has an intrinsic alkaline degradability. Particularly preferred poly(esters) are selected from the group consisting of poly(ethylene terephthalate), poly(lactic acid), poly(caprolactone) and copolymers thereof. Poly(lactic acid) is in particular preferred for its biodegradability and its manufacture from renewable resources.

Strategies to design poly(esters) with enhanced alkaline solubility and degradability have been disclosed based on the introduction of hydrophilic blocks, preferably poly(ethylene glycol) fragments, in the poly(ester) structure as disclosed in JP7145509 (Toyo Boseki), optionally in combination with the introduction of additional water solubilizing groups as disclosed in CN1439751 (Jinan Zhenghao Advanced Fiber Co.) and KR2018110827 (Toray Chemical Korea Inc.). Further strategies can be based on the introduction of reactive esters in the poly(ester) backbone, such as oxalate esters, making the fiber more sensitive towards alkaline treatment.

Polymer fabrics may be used alone, or a combination of two or more polymeric fabrics may be used to manufacture the support.

Dissolved material from the support or degradation products of the support after removal of the support by the electrolyte of an alkaline electrolyser preferably does not adversely affect the electro-catalytic properties of the electrodes, or the electrolytic process.

The support is preferably at least 50%, more preferably at least 75%, most preferably at least 90%, particular preferred at least 95% removed by an alkaline solution or an electrolyte of an alkaline electrolyser. In a most preferred embodiment, the support is completely removed by the electrolyte of an alkaline electrolyser.

Preferably, the support is substantially removed after residing 24 to 48 hours in an alkaline solution or an electrolyte of an alkaline electrolyser. However, the support may also be substantially removed after 2 weeks or a month in the alkaline solution or the electrolyte of an alkaline electrolyser.

However, the temporary support has to withstand the ingredients, in particular the solvents, used in a preparation method of the separator.

For example, the temporary support has to be resistant against the solvents of a dope solution used in a preparation method of the separator described below preferably for at least 0.5 minute, more preferably for at least 1 minute, most preferably for at least 2 minutes, particularly preferred for at least 5 minutes to enable a coating step wherein a dope solution is applied on the temporary support.

After a coagulation step described below, the solvents of a dope solution are removed, resulting in a very low residual amount (preferably <10 g/m$^2$, more preferable <5 g/m$^2$) that will no longer affect the support.

Polymer Resin

The porous layer comprises a polymer resin.

The polymer resin forms a three dimensional porous network, the result of a phase inversion step in the preparation of the separator, as described below.

The polymer resin may be selected from a fluorine resin such as polyvinylidene fluoride (PVDF) and polytetrafluoroethylene (PTFE), an olefin resin such as polypropylene (PP), and an aromatic hydrocarbon resin such as polyethylene terephthalate (PET) and polystyrene (PS). The polymer resins may be used alone, or two or more of the polymer resins may be used in combination.

PVDF and vinylidenefluoride (VDF)-copolymers are preferred for their oxidation/reduction resistance and film-forming properties. Among these, terpolymers of VDF, hexanefluoropropylene (HFP) and chlorotrifluoroethylene (CTFE) are preferred for their excellent swelling properties, heat resistance and adhesion to electrodes.

Another preferred polymer resin is an aromatic hydrocarbon resin for their excellent heat and alkali resistance. Examples of an aromatic hydrocarbon resin include polyethylene terephthalate, polybutylene terephthalate, polybutylene naphthalate, polystyrene, polysulfone, polyethersulfone, polyphenylene sulfide, polyphenyl sulfone, polyacrylate, polyetherimide, polyimide, and polyamide-imide.

A particular preferred polymer resin is selected from the group consisting of polysulfone, polyethersulfone and polyphenylsulfone, polysulfone being the most preferred.

The molecular weight (Mw) of polysulfones, polyether sulfones and polyphenyl sulfones is preferably between 10 000 and 500 000, more preferably between 25 000 and 250 000. When the Mw is too low, the physical strength of the porous layer may become insufficient. When the Mw is too high, the viscosity of the dope solution may become too high.

Examples of polysulfones, polyether sulfones and combinations thereof are disclosed in EP-A 3085815, paragraphs [0021] to [0032].

A polymer resin may be used alone, or two or more polymer resins may be used in combination.

Inorganic Hydrophilic Particles

The hydrophilic layer also comprises hydrophilic particles.

Preferred hydrophilic particles are selected from metal oxides and metal hydroxides.

Preferred metal oxides are selected from the group consisting of zirconium oxide, titanium oxide, bismuth oxide, cerium oxide and magnesium oxide.

Preferred metal hydroxides are selected from the group consisting of zirconium hydroxide, titanium hydroxide, bismuth hydroxide, cerium hydroxide and magnesium hydroxide. A particularly preferred magnesium hydroxide is disclosed in EP-A 3660188, paragraphs [0040] to [0063].

Other preferred hydrophilic particles are barium sulfate particles.

Other hydrophilic particles that may be used are nitrides and carbides of Group IV elements of the periodic tables.

The hydrophilic particles preferably have a D50 particle size of 0.05 to 2.0 µm, more preferably of 0.1 to 1.5 µm, most preferably of 0.15 to 1.00 µm, particularly preferred of 0.2 to 0.75 µm. The D50 particle size is preferably less than or equal to 0.7 µm, preferably less than or equal to 0.55 µm, more preferably less than or equal to 0.40 µm.

The D50 particle size is also known as the median diameter or the medium value of the particle size distribution. It is the value of the particle diameter at 50% in the cumulative distribution. For example, if D50=0.1 um, then 50% of the particles are larger than 1.0 um, and 50% are smaller than 1.0 um.

The D50 particle size is preferably measured using laser diffraction, for example using a Mastersizer from Malvern Panalytical.

The amount of the hydrophilic particles relative to the total dry weight of the porous layer is preferably at least 50 wt %, more preferably at least 75 wt %.

The weight ratio of hydrophilic particles to polymer resin is preferably more then 60/40, more preferably more than 70/30, most preferably more than 75/25.

Dope Solution

The dope solution preferably comprises a polymer resin as described above, hydrophilic particles as described above and a solvent.

The solvent of the dope solution is preferably an organic solvent wherein the polymer resin can be dissolved. Moreover, the organic solvent is preferably miscible in water.

The solvent is preferably selected from N-methyl-pyrrolidone (NMP), N-ethyl-pyrrolidone (NEP), N-butyl-pyrrolidone (NBP), N,N-dimethylformamide (DMF), formamide, dimethylsulfoxide (DMSO), N,N-dimethylacetamide (DMAC), acetonitrile, and mixtures thereof.

A highly preferred solvent, especially for health and safety reasons, is NBP.

The dope solution may further comprise other ingredients to optimize the properties of the obtained polymer layers, for example their porosity and the maximum pore diameter at their outer surface.

The dope solution preferably comprises an additive to optimize the pore size at the surface and inside of the porous layer. Such additives may be organic or inorganic compounds, or a combination thereof.

Organic compounds which may influence the pore formation in the porous layers include polyethylene glycol, polyethylene oxide, polypropylene glycol, ethylene glycol, tripropylene glycol, glycerol, polyhydric alcohols, dibutyl phthalate (DBP), diethyl phthalate (DEP), diundecyl phthalate (DUP), isononanoic acid or neo decanoic acid, polyvinylpyrrolidone, polyvinyl-alcohol, polyvinylacetate, polyethyleneimine, polyacrylic acid, methylcellulose and dextran.

Preferred organic compounds which may influence the pore formation in the porous layers are selected from polyethylene glycol, polyethylene oxide, polyvinylpyrrolidone.

A preferred polyethylene glycol has a molecular weight of from 10000 to 50000, a preferred polyethylene oxide has a molecular weight of from 50000 to 300000, and a preferred polyvinylpyrrolidone has a molecular weight of from 30000 to 1000000.

A particularly preferred organic compound which may influence the pore formation in the porous layers is glycerol.

The amount of compounds which may influence the pore formation is preferably between 0.1 and 15 wt %, more preferably between 0.5 and 5 wt % relative to the total weight of the dope solution.

Inorganic compounds which may influence the pore formation include calcium chloride, magnesium chloride, lithium chloride and bariumsulfate.

A combination of two or more additives that influence the pore formation may be used.

In case two polymers layers are applied on the porous support, the dope solution used for both layers may be identical or different from each other.

Electrolyser

The separator for alkaline water electrolysis according to the present invention may be a used in an alkaline water electrolyser.

An electrolysis cell typically consists of two electrodes, an anode and a cathode, separated by a separator. An electrolyte is present between both electrodes.

When electrical energy (voltage) is supplied to the electrolysis cell, hydroxyl ions of the electrolyte are oxidized into oxygen at the anode and water is reduced to hydrogen at the cathode. The hydroxyl ions formed at the cathode migrate through the separator to the anode. The separator prevents mixing of the hydrogen and oxygen gases formed during electrolysis.

An electrolyte solution is typically an alkaline solution. Preferred electrolyte solutions are aqueous solutions of electrolytes selected from sodium hydroxide or potassium hydroxide. Potassium hydroxide electrolytes are often preferred due to their higher specific conductivity. The concentration of the electrolyte in the electrolyte solution is preferably from 10 to 40 wt %, more preferably from 20 to 35 wt %, relative to the total weight of the electrolyte solution. A highly preferred electrolyte is a 30 wt % aqueous KOH solution. The temperature of the electrolyte solution is preferably from 50° C. to 120° C., more preferably from 80° C. to 100° C.

An electrode typically include a substrate provided with a so-called catalyst layer. The catalyst layer may be different for the anode, where oxygen is formed, and the cathode, where hydrogen is formed.

Typical substrates are made from electrically conductive materials selected from the group consisting of nickel, iron, soft steels, stainless steels, vanadium, molybdenum, copper, silver, manganese, platinum group elements, graphite, and chromium. The substrates may be made from an electrically conductive alloy of two or more metals or a mixture of two or more electrically conductive materials. A preferred material is nickel or nickel-based alloys. Nickel has a good stability in strong alkaline solutions, has a good conductivity and is relatively cheap.

The catalyst layer provided on the anode preferably has a high oxygen-generating ability. The catalyst layer preferably includes nickel, cobalt, iron, and platinum group elements. The catalyst layer may include these elements as elemental metals, compounds (e.g., oxides), composite oxides or alloys made of multiple metal elements, or mixtures thereof. Preferred catalyst layers include plated nickel, plated alloys of nickel and cobalt or nickel and iron, complex oxides including nickel and cobalt such as $LaNiO_3$, $LaCoO_3$, and $NiCo_2O_4$, compounds of platinum group elements such as iridium oxide, or carbon materials such as graphene.

The Raney nickel structure is formed by selectively leaching aluminium or zinc from a Ni—Al or Ni—Zn alloy. Lattice vacancies formed during leaching result in a large surface area and a high density of lattice defects, which are active sites for the electrocatalytic reaction to take place.

The catalyst layer may also include organic substances such as polymers to improve the durability and the adhesion towards the substrate.

The catalyst layer provided on the cathode preferably has a high hydrogen-generating ability. The catalyst layer preferably includes nickel, cobalt, iron, and platinum group elements. To realize the desired activity and durability, the catalyst layer may include a metal, a compound such as an oxide, a complex oxide or alloy composed of a plurality of metal elements, or a mixture thereof. A preferred catalyst layer is formed from Raney Nickel; Raney alloys made of combinations of multiple materials (e.g. nickel and aluminium, nickel and tin); porous coatings made by spraying nickel compounds or cobalt compounds by plasma thermal spraying; alloys and composite compounds of nickel and an element selected from cobalt, iron, molybdenum, silver, and copper, for example; elementary metals and oxides of platinum group elements with high hydrogen generation abilities (e.g. platinum and ruthenium); mixtures of elementary metals or oxides of those platinum group element metals and compounds of another platinum group element (e.g. iridium or palladium) or compounds of rare earth metals (e.g. lanthanum and cerium); and carbon materials (e.g. graphene).

For providing higher catalyst activity and durability, the above described materials may be laminated in a plurality of layers, or may be contained in the catalyst layer.

An organic material, such as a polymer material, may be contained for improved durability or adhesiveness to the substrate.

In a so-called zero gap electrolytic cell the electrodes are placed directly in contact with the separator thereby reducing the space between both electrodes. Mesh-type or porous electrodes are used to enable the separator to be filled with electrolyte and for efficient removal of the oxygen and hydrogen gasses formed. It has been observed such zero gap electrolytic cells operate at higher current densities.

A typical alkaline water electrolyser includes several electrolytic cells, also referred to stack of electrolytic cells, described above.

The invention claimed is:

1. A method of preparing a reinforced separator comprising the steps of:
providing a porous support on a pre-wetted casting drum;
applying a dope solution including a polymer resin and hydrophilic inorganic particles on a side of the porous support other than a side of the porous support in contact with the pre-wetted casting drum;
performing phase inversion of the applied dope solution thereby obtaining a reinforced separator; and
removing the reinforced separator from the casting drum,
wherein the casting drum is pre-wetted with a non-solvent for the polymer resin, wherein the pre-wetted casting drum is obtained by applying a layer of non-solvent on the casting drum, wherein the layer of non-solvent on the casting drum has a thickness that is lower than the thickness of the porous support, and wherein the pre-wetted casting drum contains less than 50 g of non-solvent per $m^2$ surface area of the casting drum.

2. The method of claim 1, wherein an engraved casting drum is used.

3. The method of claim 1, wherein the surface tension of the non-solvent is less than 40 mN/m.

4. The method of claim 1, wherein the non-solvent includes a surfactant.

5. The method of claim 1, wherein the non-solvent includes a thickening agent.

6. The method of claim 1, wherein the phase inversion step includes a liquid induced phase separation (LIPS) step using a non-solvent for the polymer resin of the dope solution.

7. The method of claim 6, wherein the non-solvent for pre-wetting the casting drum and for the LIPS step are the same.

8. The method of claim 6, wherein the phase inversion step further includes a Vapour Induced Phase Separation (VIPS) step.

9. The method of claim 1, wherein the polymer resin is selected from the group consisting of polysulfone, polyethersulfone, and polyphenylsulfide.

10. The method of claim 1, wherein the hydrophilic inorganic particles are selected from group consisting of zirconium oxide particles, zirconium hydroxide particles, magnesium oxide particles, magnesium hydroxide particles, titanium oxide particles, titanium hydroxide particles, and bariumsulfate particles.

11. The method of claim 1, wherein the porous support has an open area from 30% to 80%.

12. The method of claim 1, wherein the porous support has a thickness from 40 µm to 200 µm.

13. The method of claim 1, wherein the reinforced separator has a thickness from 100 µm to 350 µm.

* * * * *